US 6,594,006 B1
Jul. 15, 2003

(54) METHOD AND ARRAY FOR DETECTING THE POSITION OF A PLANE SCANNED WITH A LASER SCANNER

(75) Inventors: Dirk Muehlhoff, Jena (DE); Guenther Rudolph, Jena (DE); Stefan Schmidt, Jena (DE); Gerhard Doering, Schloeben (DE); Guenter Berthel, Jena (DE); Thomas Hartmann, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/744,122
(22) PCT Filed: May 18, 2000
(86) PCT No.: PCT/EP00/04493
§ 371 (c)(1), (2), (4) Date: Mar. 16, 2001
(87) PCT Pub. No.: WO00/72078
PCT Pub. Date: Nov. 30, 2000

(30) Foreign Application Priority Data

May 19, 1999 (DE) .......................... 199 23 821

(51) Int. Cl.$^7$ .............................. G01B 11/26; G01C 1/00
(52) U.S. Cl. .............................. 356/139.03; 356/139.1; 356/152.1
(58) Field of Search .................. 356/139.03, 139.1, 356/152.1, 152.2

(56) References Cited

U.S. PATENT DOCUMENTS

| 4,723,845 | A | * | 2/1988 | Mizutani et al. | 356/375 |
|---|---|---|---|---|---|
| 4,978,841 | A | * | 12/1990 | Barrett et al. | 250/548 |
| 5,532,815 | A | * | 7/1996 | Kipman et al. | 356/139.03 |
| 5,570,185 | A | * | 10/1996 | Jokinen et al. | 356/375 |
| 5,729,337 | A | * | 3/1998 | Tanaka | 356/139.1 |
| 5,783,814 | A | | 7/1998 | Fairley et al. | |
| 5,790,710 | A | | 8/1998 | Price et al. | |
| 6,088,090 | A | * | 7/2000 | Hoshi et al. | 356/139.1 |
| 6,259,519 | B1 | * | 7/2001 | Hooker et al. | 356/139.03 |

FOREIGN PATENT DOCUMENTS

| DE | 197 26 696 | 1/1999 |
|---|---|---|
| WO | WO 98/35256 | 8/1998 |

* cited by examiner

Primary Examiner—Thomas H. Tarcza
Assistant Examiner—Brian Andrea
(74) Attorney, Agent, or Firm—Reed Smith LLP

(57) ABSTRACT

A method and an arrangement for detecting the position of the plane XY of an object, which plane XY is to be scanned, and for its positioning in the focal plane X'Y' of a laser scanner, preferably for a laser scanning microscope. According to the disclosure, it is provided in a method of the type described above that, after a rough orientation of the object carried out by placing on an object holder, a laser beam is directed successively in time to at least three different points $P_1, P_2 \ldots P_n$ located in the scan plane XY of the object and, in doing so, each of the reflections proceeding from the points $P_1, P_2 \ldots P_n$ is imaged on a position-sensitive detector, an actual position value is determined at the detector for each reflection and is compared with a stored reference position value, adjustment commands for changing the inclination of the object holder are obtained from the deviations of the actual position values from the reference position values, and the inclination of the object holder is changed on the basis of these adjustment commands until points $P_1, P_2 \ldots P_n$ are located in the focal plane X'Y' of the laser scanner.

18 Claims, 4 Drawing Sheets

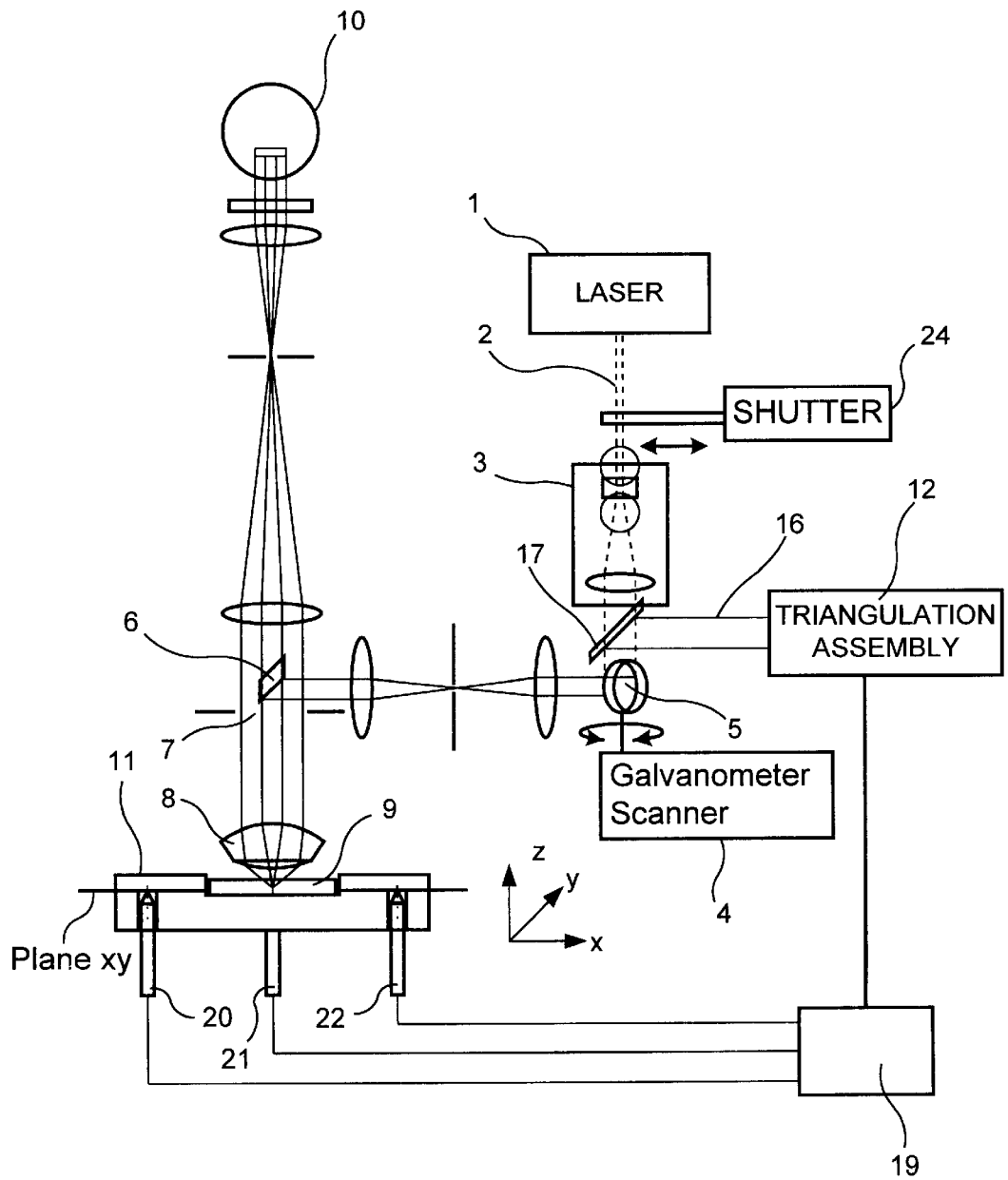
F I G. 1

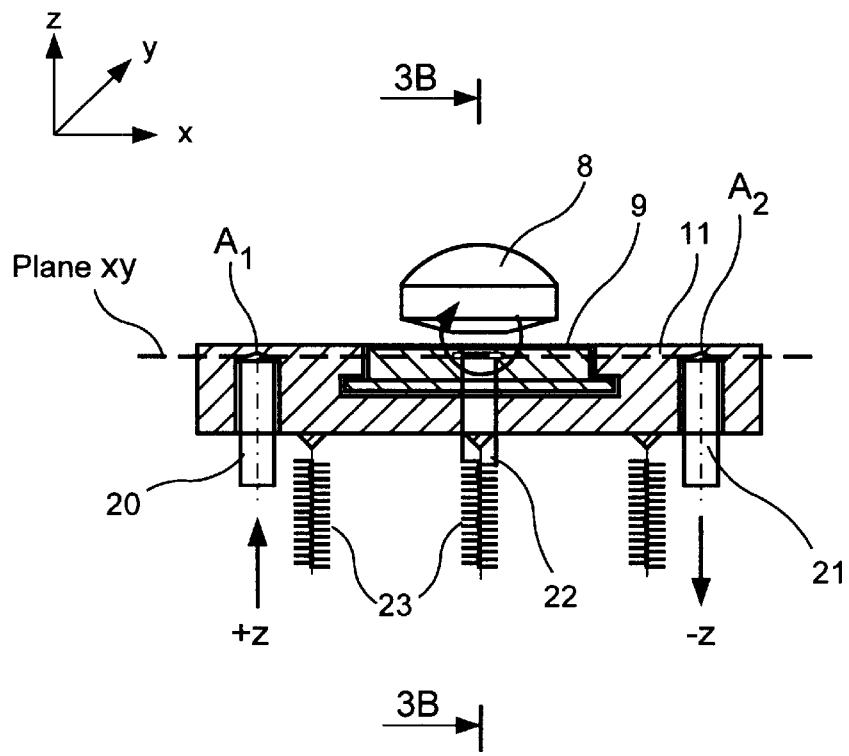
F I G. 3A
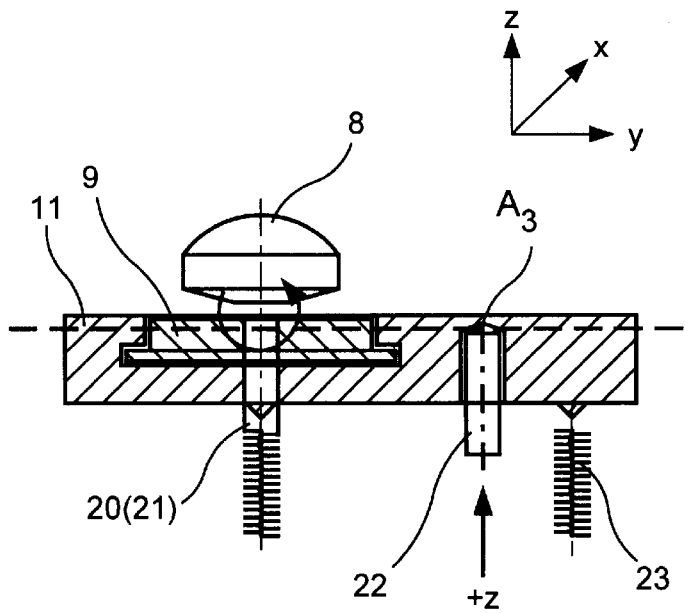
F I G. 3B

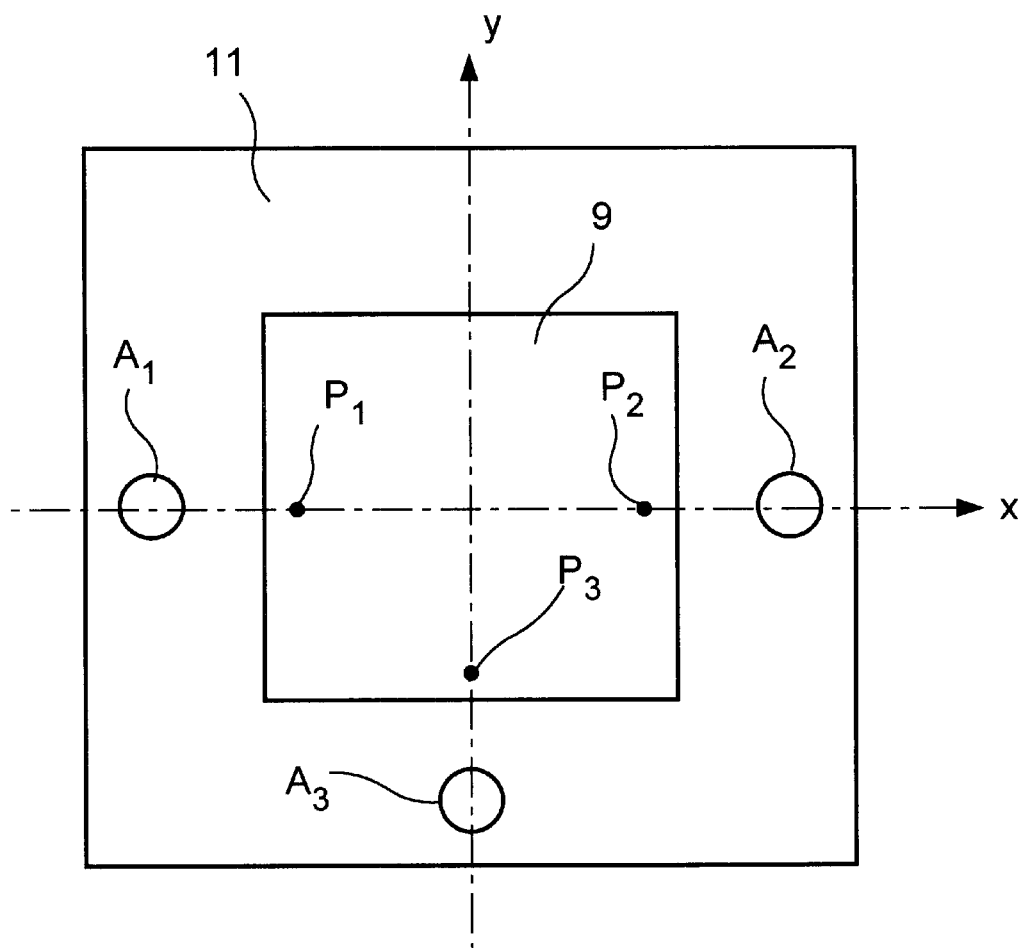
F I G. 4

METHOD AND ARRAY FOR DETECTING THE POSITION OF A PLANE SCANNED WITH A LASER SCANNER

CROSS-REFERENCES TO RELATED APPLICATIONS

This application claims priority of International Application No. PCT/EP00/04493, filed May 18, 2000 and German Application No. 199 23 821.9, filed May 19, 1999, the complete disclosures of which are hereby incorporated by reference.

BACKGROUND OF THE INVENTION a) Field of the Invention

The invention is directed to a method and an arrangement for detecting the position of the scanned plane XY of an object and for its positioning in the focal plane X'Y' of a laser scanner, preferably in a laser scanning microscope.

b) Description of the Related Art

In the last two decades, scanners have achieved an advanced state of the art. Particularly in medical engineering, metrology and, above all, in microscopy, it is becoming more and more common for objects to be scanned by a laser beam. In the biological-medical field, for example, laser scanning microscopes have clear advantages over conventional microscopes which stem essentially from the higher resolution that can be achieved and the possibility of differentiating between determined depth layers.

Accordingly, in fluorescence microscopy, due to the high point intensity of the focused laser beam, it is possible to utilize the sensitivity of photomultipliers for image building when the fluorescence itself is weak. However, XY scanners require very high positioning accuracy in orientating the object to be scanned relative to the focusing plane of the microscope.

The precision with which the plane of the specimen to be analyzed must be brought into the focus of the laser beam in order to prevent intensity losses and avoid deficient image quality increases as depth resolution increases.

To this extent, in connection with the continuing development in this technical field, it is necessary to provide methods and arrangements by which the objects and planes to be scanned can be exactly and, if possible, automatically oriented relative to the focal plane. In general, requirements can no longer be met by the technique, still often applied, of positioning by means of sensitively adjustable manual drives with repeated position correction.

OBJECT AND SUMMARY OF THE INVENTION

On this basis, it is the primary object of the invention to provide a method enabling an automatic and precise positioning of a scan plane XY in the focal plane X'Y' of a laser scanner.

According to the invention, it is provided in a method of the type described above that, after a rough orientation of the object carried out by fixing on an object holder, a laser beam is directed successively in time to at least three different points $P_1, P_2 \ldots P_n$ located in the scan plane XY of the object and, in doing so, each of the reflections proceeding from the points $P_1, P_2 \ldots P_n$ is imaged on a position-sensitive detector, an actual position value is determined at the detector for each reflection and is compared with a stored reference position value, actuating or adjustment commands for changing the inclination of the object holder are obtained from the deviations of the actual position values from the reference position values, and the inclination of the object holder is changed on the basis of these adjustment commands until points $P_1, P_2 \ldots P_n$ are located in the focal plane X'Y' of the laser scanner.

The essential advantages of this method consist in that, to a great extent, components which already exist in a laser scanner can be used for determining position, e.g., the position transmitter for the laser beam and the optical elements for transmitting the laser radiation reflected by the specimen to an optoelectronic reception device, followed by an evaluating unit. Further, positioning is not only more exact in this way, but is also substantially faster than in any of the previously known methods.

In a preferred embodiment of the method according to the invention, three points $P_1(x_1;y_1)$, $P_2(x_2;y_2)$ and $P_3(x_3;y_3)$, where $y_1=y_2=x_3=0$ and $x_1=-x_2\neq 0$; $y_3\neq 0$, are sampled, wherein one point $P_0$, where $x_0=y_0=0$, lies approximately in the center of the object and/or of the plane XY to be scanned, $P_1, P_2, P_3$ are preferably points near the edges of the object, and the deviations between the actual position values and reference position values are determined according to the principle of laser triangulation.

Accordingly, three points $P_1, P_2, P_3$ are defined which are advantageously suited to position detection because, first, they are located far apart from each other due to their position at the edges of the object or at the edges of the plane XY to be scanned, which creates favorable preconditions for laser triangulation, and, second, they can be controlled in an uncomplicated manner assuming that point $P_0$ approximately defines the starting position of the laser beam in the coordinate origin of the focal plane X'Y'.

In triangulation, a light point is projected by means of a laser beam onto the plane of the measurement object to be scanned and the reflected light is imaged on a position-sensitive detector. The position of the reflection on the detector varies depending on the distance between the plane XY to be scanned and the objective, as measured in coordinate Z. The signal emitted by the detector is accordingly a measure for the distance between the reflecting surface and the objective or a measure of whether or not the reflecting point lies in the focus of the objective.

According to the invention, the object is initially oriented in such a way that the laser beam is directed, e.g., on position $P_0$, the scanning device is then controlled in such a way that the laser beam is directed to point $P_1$, a parallel displacement of the object holder in Z-direction is effected, if need be, until the reflection of $P_1$ supplies a definite signal to the detector, the actual position value for point $P_1$ is acquired, the scanning device is then controlled in such a way that the laser beam is directed to point $P_2$, the actual position value for point $P_2$ is now acquired, adjustment commands for tilting the object holder about the Y-axis are now determined from the deviations between the actual position values and reference position values, and the orientation of the X-axis of plane XY parallel to the focal plane X'Y' is brought about, the scanning device is then controlled in such a way that the laser beam is directed to point $P_3$, the actual position value for point $P_3$ is detected and, finally, an adjustment command for tilting the object holder about the X-axis is determined from the deviation of the actual position value from the reference position value of point $P_3$ and, accordingly, the parallel orientation of the Y-axis of plane XY relative to the focal plane X'Y' is brought about.

In a particularly preferred construction of the invention, the steps indicated above are repeated in order to determine any existing deviations and to readjust in the described manner until no deviations are measurable and the planes XY are adjusted parallel with the focal plane X'Y'.

Further, it lies within the framework of the invention that after this orientation of plane XY a parallel displacement in Z-direction is carried out, namely, until the reflections of $P_1$, $P_2$, $P_3$ are imaged on the detector with maximum intensity. In this way, it is ensured with great dependability that the plane XY to be scanned is not only oriented parallel to the focal plane X'Y', but coincides with it.

It is a further object of the invention to provide an arrangement for carrying out the method steps mentioned above and for determining the position of the scan plane XY of an object and for its positioning in the focal plane X'Y' of a laser scanner, preferably a laser scanning microscope.

This object is met, according to the invention, by an arrangement which is outfitted with an object holder for receiving the object, with a photo-sensitive detector for locating the reflections of three points $P_1$, $P_2$, $P_3$ which lie in plane XY and are sampled successively or simultaneously by a laser beam, with an evaluating circuit for determining deviations of the actual position value of each of these reflections from its reference position value on the detector, and with an adjusting device connected with the evaluating circuit for changing the inclination of the object holder relative to the focal plane X'Y' of the laser scanner.

The arrangement according to the invention is preferably directed to a laser scanner, known per se from the prior art, which has a mirror supported on a rotatable shaft for deflecting a laser beam in the direction of coordinate X' and in which the object holder is displaceable in a straight line in the direction of coordinate Y', wherein the series of movements can be controlled and monitored by drives which are coupled with position transmitters.

In a preferred embodiment of the invention, the detector is constructed as a CCD line with 256 pixels and is a component part of a triangulation assembly in which there is further provided at least one laser diode as a separate radiation source for sampling points $P_1$, $P_2$, $P_3$, preferably with a laser wavelength $\lambda$ greater than or equal to 780 nm and independent control, and optics for coupling the diode radiation, e.g., into the infinite beam path of the laser scanner.

It is particularly advantageous when the diode radiation has a Gaussian intensity profile and the actual positions of the diode beam reflected by points $P_1$, $P_2$, $P_3$ on the CCD line are defined by the centroid of the Gaussian function. The steps for determining the centroid are known from the prior art and are therefore indicated only briefly herein.

First, the pixel with maximum intensity and the level of the base signal are determined on the CCD line. The half-height of the Gaussian function is calculated from these values and the intersections of the Gaussian function with the half-height are determined, wherein linear interpolation is carried out between the pixels. The mean value between the intersections approximates the centroid. By means of interpolation, the centroid is obtained with a resolution which is better than the pixel size and is only limited by the noise and deviations of the measurement signal from the assumed Gaussian function.

According to the invention, it is further provided that a storage is provided in the evaluating circuit with reference position values (associated with points $P_1$, $P_2$, $P_3$), wherein the reference position is preferably defined in each instance in the center of the CCD line and, further, the evaluating unit has a subtracter, wherein an actual position value and a reference position value are applied to the inputs of this subtracter during every evaluation, with reference in each instance to one of the points $P_1$, $P_2$, $P_3$, and a difference signal can be taken off at the output of the subtracter as an adjusting signal for the adjusting device coupled with the object holder.

The adjusting device is advantageously constructed in such a way that it has three drive elements which can be advanced separately in the direction of coordinate Z, each drive element being mechanically connected with the object holder via a separate articulation point $A_1$, $A_2$, $A_3$. The articulation points $A_1$, $A_2$, $A_3$ and points $P_1$, $P_2$, $P_3$ lie in plane XY. Further, articulation points $A_1$ and $A_2$ are located along with points $P_1$ and $P_2$ on the same straight line which also passes through the coordinate origin $P_0$ and accordingly forms the X-axis, while points $A_3$, $P_3$ and the coordinate origin likewise lie on a common straight line, namely, the Y-axis.

Due to this arrangement in connection with the separate controllability of the drive elements, it is ensured that the object holder can be tilted about the Y-axis, for example, when the articulation points $A_1$ and $A_2$ are controlled in opposite directions, while articulation point $A_3$ remains stationary relatively. Further, this makes it possible to tilt the object holder in a defined manner about the X-axis insofar as only articulation point $A_3$ is controlled and articulation points $A_1$ and $A_2$ remain stationary relatively.

This construction of the adjusting device according to the invention has the advantageous result that the angle adjusting movements about the X-axis on the one hand and Y-axis on the other hand can be carried out independent from one another and the X-axis need no longer be readjusted while the Y-axis is moved, and vice versa.

It is further advantageously provided that the drive elements are piezoelectric drives or, in an alternative construction, precision-movement threaded spindles coupled with rotating drives. Further, the adjusting mechanism can be constructed in such a way that the drive elements engage in recesses of the object holder, the drive elements contact the object holder within the recesses based on a ball-and-socket principle, and the drive elements and object holder are biased or pretensioned relative to one another elastically by means of springs so that they are mounted without play.

Of course, different constructions of the drive elements are possible: for example, pins which are displaceable in guides and which contact articulation points $A_1$, $A_2$, $A_3$ on the one hand and are in contact with cam surfaces on the other hand, wherein the cams are driven by stepper motors which are outfitted with corresponding gear units for achieving the required precision.

For the sake of completeness, it is noted that while the invention has been explained with reference to the triangulation principle for detecting the laser radiation reflected by points $P_1$, $P_2$, $P_3$, this does not rule out the use of other means for detecting the position of these reflections. In this respect, it is merely noted that it is possible to direct a collimated symmetric laser beam vertical to plane XY and to image the reflection on a quadrant diode via a cylindrical lens. In this regard, the ellipticity of the focus on the quadrant diode is a measure for the deviation of the position of the point acted upon by the laser beam from the focal plane. A contrast determining process can also be applied, for example, in which the distance between points $P_1$, $P_2$, $P_3$ is changed during scanning until a contrast function derived from the determined image has reached its maximum. A simple contrast can be determined as well as the frequency spectrum of the image information.

The invention described above can be applied in a particularly advantageous manner for scanning the bottoms of microtiter plates and biochips containing fluorescing specimens. However, it must be taken into account in this regard that the laser radiation is reflected twice, namely, once by the underside and a second time by the inner side of the bottom of the plate. In other words, depending on spatial resolution, one or two laser reflections can appear on the CCD line. Since the inner side is closer to the specimen to be scanned, this reflecting surface is preferably used for orientation.

It may also be advantageous under certain circumstances when there is a second laser diode (in addition to the laser radiation source provided for fluorescence microscopy of the specimen) in the triangulation assembly instead of only one; although only one needs to be active at any time, the widely different apertures of different objectives can be taken into account in this way.

In another development, a mechanical shutter can be provided which blocks the microscope laser beam during the orientation of the plane XY. This prevents unwanted bleaching of the specimen.

The invention will be explained more fully in the following with reference to an embodiment example.

BRIEF DESCRIPTION OF THE DRAWINGS

In the drawings:

FIG. 1 shows the basic construction of a laser scanner with the arrangement according to the invention;

FIGS. 3a, 3b show the principle of the coupling of separate drive elements to the object holder; and FIG. 4 shows a top view of the object holder with an object placed on it.

DESCRIPTION OF THE PREFERRED EMBODIMENTS

Figure 2:
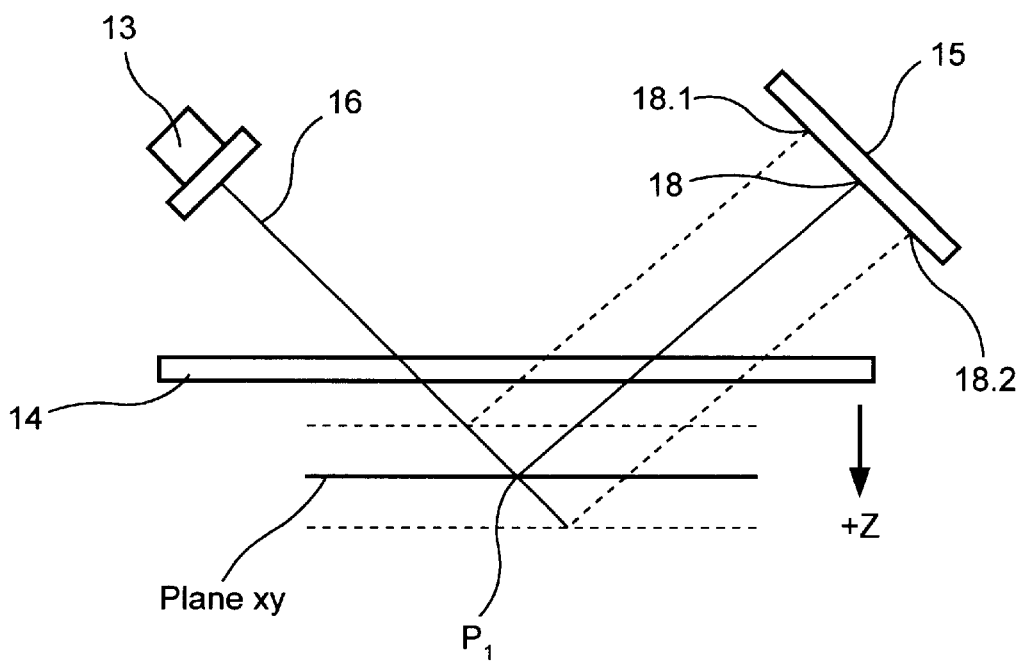
FIG. 2 shows an illustration of the principle of laser triangulation.

FIG. 1 shows the principle of a laser scanning microscope in which a laser beam 2 proceeding from a laser 1 is reflected via a beam splitter 6 into the microscope beam path 7 via beam-expanding optics 3 and a galvanometer scanner 4 having a mirror 5 mounted on a rotating shaft for deflecting the laser beam in coordinate X'.

The microscope beam path 7 is directed to an object 9 through the microscope objective 8. The object 9 is, for example, a microtiter plate or biochip for receiving fluorescing specimens. The bottoms of the microtiter plates are utilized as plane XY.

The readout of the specimen is normally carried out through a photoreceiver 10 based on the fluorescence radiation reflected back into the microscope objective 8.

The specimen is deposited on an object holder 11 which is displaceable in coordinate Y' (not shown), so that a plane XY can be scanned by laser beam 2 by means of the cooperation of the galvanometer scanner 4 and the displacement of the object holder 11.

In order to ensure that the scan plane XY of the object 9 is positioned in the focal plane X'Y' of the laser scanning microscope as a prerequisite for a high-quality image generation with this device, a triangulation assembly 12 whose basic construction is shown in FIG. 2 is provided according to the invention.

FIG. 2 shows that the triangulation assembly 12 has a laser diode 13 which emits a laser beam with $\lambda=780$ nm, reader optics 14 and a CCD line 15, for example, with 256 pixels.

The principle of laser triangulation and accordingly also the manner of operation of the triangulation assembly 12 will be explained briefly with reference to FIG. 2. The diode radiation 16 proceeding from the laser diode 13 is directed through reader optics 14 onto the scan plane XY of the object 9. The position at which the diode radiation 16 impinges on the plane XY, can be influenced by the scanning device of the laser scanning microscope in that the galvanometer scanner 4 and the table or stage control for the displacement of the object holder 11 in coordinate Y are controlled in a corresponding manner and the diode radiation 16 is reflected into the infinite beam path of the scanning device via a beam splitter 17 as is shown in FIG. 1.

For purposes of illustration, it is assumed that the scanning device is controlled in such a way that the diode radiation 16 impinges on a point $P_1$ of the plane XY (see FIG. 2). The diode beam 16 reflected from plane XY then passes again through the reader optics 14 and impinges on the CCD line 15 at position 18.

It is also clear from FIG. 2 that the position of the reflection impinging on CCD line 15 changes with the changing distance of plane XY or point $P_1$ from the reader optics 14 and accordingly also from the microscope objective 8. When position 18 is defined, using this principle, in such a way that it corresponds to the exact focal distance of plane XY in point $P_1$, the amount by which the position of point $P_1$ deviates from the focal position can be measured by comparing, e.g., positions 18.1 or 18.2 with the desired position 18 by evaluating the pixels located therebetween.

FIG. 1 further shows that the triangulation assembly 12 is connected with an evaluating circuit 19 which is constructed for determining these deviations. For this purpose, a subtracter is provided in the evaluating circuit 19; this subtracter determines, for every optional point $P_1, P_2 \ldots P_n$ on which the diode radiation 16 is directed by means of the scanning device, a difference signal from the position deviations in the manner described above.

According to the invention, the evaluating circuit 19 is connected via signal paths with three drive elements 20, 21, 22 which can be controlled independently from one another and which are designed for adjusting the object holder 11 in the direction of coordinate Z. For example, precision-movement spindles coupled with controllable rotating drives (not shown in more detail in the drawings) are provided as drive elements 20, 21, 22.

FIG. 3a and FIG. 3b show the principle of mechanical coupling between the drive elements 20, 21, 22 resulting in the functioning of the adjusting device illustrated in the following.

FIG. 3a and FIG. 3b show the microscope objective 8 and the objective holder 11. Also indicated is the plane XY in which the specimen 9 to be scanned is located.

FIG. 3a shows the object holder 11 in a section through the XY plane, wherein it will be seen that the articulation points $A_1$ and $A_2$ by which power and movement are transmitted from the drive elements 20 and 21 to the object holder 11 lie in plane XY as well as in the XZ plane (drawing plane). Both articulation points $A_1$ and $A_2$ are accordingly arranged in the X-axis (at about the same distance from the coordinate origin).

FIG. 3b shows section BB from FIG. 3a and accordingly shows a section through plane YZ. It will be seen that the articulation point $A_3$ by which the third drive element 22 and the object holder 11 are coupled with one another lies in plane YZ as well as in plane XY and accordingly on the Y-axis.

Consequently, the coupling of the object holder 11 to the drive elements 20, 21, 22 involves a three-point bearing, wherein two of the support points ($A_1$, $A_2$) lie in the X-axis and the third support point ($A_3$) lies in the Y-axis.

When the drive elements 20 and 21 are advanced in opposite directions +z and −z, as is indicated in FIG. 3a, and the drive element 22 is at rest, the inclination of the object holder 11 is changed and, therefore, the inclination of the plane XY to be scanned about its Y-axis is changed.

On the other hand, it will be seen from FIG. 3b that when the drive element 22 is advanced in direction +z and drive elements 20 and 21 are stationary, the object holder is tilted about the X-axis.

FIG. 3a and FIG. 3b also show tension springs 23 which cause an elastic pretensioning of the object holder 11 relative to the drive elements 20, 21, 22. The contact surfaces between the object holder 11 and drive elements 20, 21, 22 are preferably formed in the manner of a ball and socket.

FIG. 4 shows the object holder 11 in a simplified view from the top. The positioning of the articulation points $A_1$, $A_2$, $A_3$ is illustrated once again, wherein it will be seen that $A_1$ and $A_2$ lie on the X-axis and $A_3$ lies on the Y-axis. Moreover, all three articulation points $A_1$, $A_2$, $A_3$ are positioned in the XY plane which, in this case, is the drawing plane.

The object 9 is positioned in the center of the object holder 11. Object holder 11 and object 9 are oriented relative to the scanning device in such a way that the coordinate origin is arranged at least approximately in the surface centers.

With this arrangement, the method according to the invention can be carried out in the following way, wherein it is assumed for the present that the object 9 is roughly aligned on the object holder 11, that is, the plane XY to be scanned is not yet positioned in the focal plane of the laser scanning microscope.

In a first method step, the scanning device is controlled in such a way that the diode beam 16 (see also FIG. 1 and FIG. 2) is directed to a point $P_1$ which lies on the X-axis like articulation points $A_1$ and $A_2$, but preferably near the object edge in direction −x. As was already described above, the amount of deviation of point $P_1$ from the focal plane is determined based on the reflection of point $P_1$ by comparing the actual position with the comparison of the reference position stored in the evaluating unit.

In the next step, the scanning device is controlled in such a way that the laser beam is directed to a point $P_2$ on the plane XY to be scanned, wherein point $P_2$, like articulation points $A_1$ and $A_2$, lies on the X-axis, but preferably close to the object edge in direction +x. The deviation from the focal plane is determined in the same way for the reflection of point $P_2$.

The determined deviations for $P_1$ and $P_2$ are sent to the drive elements 20 and 21 as oppositely directed adjustment commands, so that a tilting about the Y-axis is caused (as was already shown), specifically, by the amount that was determined as the deviation from the reference position. The X-axis is now oriented parallel to the focal plane X'Y' with high precision or already lies within the focal plane X'Y'.

Subsequently, the scanning device is controlled in such a way that the diode radiation 16 is directed to a point $P_3$ which lies on the Y-axis like articulation point $A_3$, but preferably near the object edge in direction −y. The actual position value is now detected with the triangulation assembly 12 as was described above and an adjustment command for the drive element 22 is determined from the deviation between the actual position and the reference position of the reflection of $P_3$ on the CCD line 15, is sent to the drive element 22 and causes the object holder 11 to be tilted about the X-axis, so that orientation of the Y-axis parallel to the focal plane X'Y' is now achieved.

Optionally, the aforementioned method steps can now be repeated and, insofar as there are still discrepancies measurable between the actual position values and the reference position values, respecting the reflections of points $P_1$, $P_2$, $P_3$, position corrections can be carried out in the manner described above. Further, by simultaneous control of the control elements 20, 21, 22 in the same movement direction, the object 9 can be advanced in coordinate z until the reflections of $P_1$, $P_2$, $P_3$ are imaged on the CCD line with maximum intensity. An exact orientation of the object 9 relative to the scanning device is achieved in this way.

During the described method steps, a shutter 24 can be controlled in such a way that the laser beam 2 intended to excite fluorescence in the specimen is blocked.

While the foregoing description and drawings represent the present invention, it will be obvious to those skilled in the art that various changes may be made therein without departing from the true spirit and scope of the present invention.

What is claimed is:

1. A method for orientation of the plane XY of an object to the focal plane X'Y' of a laser scanner, which plane XY is to be optically scanned, comprising the steps of:

first roughly orienting the object on an object holder;

then, directing a laser beam successively in time to at least three different points $P_1, P_2 \ldots P_n$ lying in the plane XY and, in doing so, imaging each of the reflections proceeding from the points $P_1, P_2 \ldots P_n$ on a position-sensitive detector;

determining an actual position value at the detector for each reflection and comparing said value with a stored reference position value;

obtaining adjustment commands for changing inclination of the object holder from deviations of the actual position values from the reference position values; and changing the inclination of the object holder until points $P_1, P_2 \ldots P_n$ are located in the focal plane X'Y'.

2. The method according to claim 1, wherein three points $P_1(x_1;y_1)$, $P_2(x_2;y_2)$ and $P_3(x_3;y_3)$, where $y_1=y_2=x_3=0$ and $x_1=-x_2\neq 0$; $y_3\neq 0$, are sampled, wherein one point $P_0$, where $x_0=y_0=0$, lies approximately in the center of plane XY, and $P_1$, $P_2$, $P_3$ are preferably points near edges of plane XY, and the deviations between the actual position values and reference position values are determined according to the principle of laser triangulation.

3. The method according to claim 2, wherein the laser scanner and the object are initially oriented relative to one another such that the laser beam is directed approximately to position $P_0$, the scanning device is then controlled in such a way that the laser beam is directed to point $P_1$, the actual position value for point $P_1$ is acquired, the scanning device is then controlled in such a way that the laser beam is directed to point $P_2$, the actual position value for point $P_2$ is acquired, adjustment commands for tilting the object holder about the Y-axis are now determined from the deviations between the actual position values and reference position values of points $P_1$ and $P_2$, and the orientation of the X-axis of plane XY parallel to the focal plane X'Y' is accordingly brought about, the scanning device is then controlled in such a way that the laser beam is directed to point $P_3$, the actual position value for point $P_3$ is detected and compared with the reference position value, and an adjustment command for tilting the object holder about the X-axis is determined from the deviation of the actual position value from the reference position value of point $P_3$ and, accordingly, the parallel orientation of the Y-axis of plane XY relative to the focal plane X'Y' is brought about.

4. The method according to claim 3, wherein said steps are repeated and, insofar as there are still discrepancies measurable between the actual position values and the reference position values, respecting the reflections of points $P_1$, $P_2$, $P_3$, a correction of orientation is carried out in the described manner until no further deviations are measurable and plane XY is adjusted so as to be parallel with the focal plane X'Y' or plane XY lies in the focal plane X'Y'.

5. The method according to claim 3, wherein, after the orientation of the laser beam on point $P_1$, a parallel displacement of the object holder in Z-direction is carried out until the reflections of $P_1$ are imaged on the detector in optimum manner.

6. The method according to claim 1, wherein, after the orientation of plane XY, a parallel displacement of the object holder in Z-direction is carried out until the reflections of $P_1$, $P_2$, $P_3$ are imaged on the detector in optimum manner.

7. An arrangement for determining the position of the plane XY of an object, which plane XY is to be scanned, and for its positioning in the focal plane X'Y' of a laser scanner, comprising:

an object holder for receiving the object;

a photo-sensitive position detector for locating the reflections of three points $P_1$, $P_2$, $P_3$ which lie in plane XY and are sampled by a laser beam;

an evaluating circuit for determining the deviation of the actual position value of each of these reflections from its reference position value on the detector; and an adjusting device connected with the evaluating circuit for changing the inclination of the object holder relative to the focal plane X'Y' of the laser scanner.

8. The arrangement according to claim 7, wherein the laser scanner has a mirror supported on a rotatable shaft for deflecting a laser beam in the direction of coordinate X' and the object holder is displaceable in a straight line in the direction of coordinate Y', wherein the series of movements can be controlled and monitored by drives which are coupled with position transmitters.

9. The arrangement according to claim 7, wherein the detector is constructed as a CCD line with 256 pixels and is a component part of a triangulation assembly which further comprises at least one laser diode with $\lambda \geq 780$ nm as a separate radiation source for sampling points $P_1$, $P_2$, $P_3$, and optics for coupling the diode radiation into the beam path of the laser scanner.

10. The arrangement according to claim 9, wherein the diode radiation has a Gaussian intensity profile and the actual position of the diode beam reflected by points $P_1$, $P_2$, $P_3$ on the CCD line is defined by the centroid of the Gaussian function.

11. The arrangement according to claim 7, wherein a storage is provided in the evaluating circuit with reference position values associated with points $P_1$, $P_2$, $P_3$, and the evaluating unit further has a subtracter, wherein an actual position value and a reference position value, each with reference to one of the points $P_1$, $P_2$, $P_3$, are applied to the inputs of this subtracter and a difference signal can be taken off at the output of the subtracter as an adjusting signal for the adjusting device coupled with the object holder.

12. The arrangement according to claim 11, wherein the adjusting device has three drive elements which can be advanced separately in the direction of coordinate Z, each drive element being mechanically connected with the object holder via an articulation point $A_1$, $A_2$, $A_3$, wherein the object holder contacts the articulation points $A_1$, $A_2$, $A_3$ according to the principle of three-point bearing, and articulation points $A_1$, $A_2$, $A_3$ and points $P_1$, $P_2$, $P_3$ lie in plane XY.

13. The arrangement according to claim 12, wherein articulation points $A_1$, $A_2$ and points $P_1$, $P_2$ lie in the X-axis of plane XY and/or articulation point $A_3$ and $P_3$ lie in the Y-axis of plane XY.

14. The arrangement according to claim 13, wherein the drive elements are piezoelectric drives or precision-movement threaded spindles coupled with rotating drives.

15. Arrangement according to claim 14, wherein the drive elements engage in recesses of the object holder, the object holder contacts the drive elements within the recesses, and the drive elements and object holder are elastically pretensioned relative to one another by springs.

16. A method for orienting the plane of a specimen under study to a focal plane of a laser scanner, the method comprising:

directing a laser beam to at least three points lying in a specimen plane;

imaging each of the reflections proceeding from the three points using a position-sensitive detector;

determining, for each point, the difference between an actual position based on the imaged reflection impinging on the position sensitive detector and a corresponding position on the focal plane; and changing the inclination of the specimen relative to the focal plane to align the three points lying in the specimen plane with the focal plane of the laser scanner.

17. The method according to claim 16, wherein the step of imaging comprises using a photo-sensitive detector array in which the position of the imaged reflection impinging on the detector array is indicative of the distance difference between the specimen plane and the focal plane.

18. The method according to claim 17, wherein the steps of directing and imaging are repeated in sequence for each of the three points.

* * * * *